(12) United States Patent
Logan et al.

(10) Patent No.: US 11,162,420 B2
(45) Date of Patent: Nov. 2, 2021

(54) GAS TURBINE ENGINE OIL SCAVENGING SYSTEM AND METHOD

(71) Applicant: PRATT & WHITNEY CANADA CORP., Longueuil (CA)

(72) Inventors: Adam Logan, Toronto (CA); Nadim Najjar, Sainte-Anne-de-Bellevue (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 114 days.

(21) Appl. No.: 16/152,889

(22) Filed: Oct. 5, 2018

(65) Prior Publication Data
US 2020/0109665 A1 Apr. 9, 2020

(51) Int. Cl.
*F02C 7/06* (2006.01)
*F02C 7/27* (2006.01)
*F02C 3/04* (2006.01)
*F01D 25/20* (2006.01)
*F02C 7/32* (2006.01)

(52) U.S. Cl.
CPC ............. *F02C 7/06* (2013.01); *F01D 25/20* (2013.01); *F02C 3/04* (2013.01); *F02C 7/27* (2013.01); *F02C 7/32* (2013.01); *F05D 2220/32* (2013.01); *F05D 2240/50* (2013.01); *F05D 2260/98* (2013.01)

(58) Field of Classification Search
CPC .. F01D 25/18; F01D 25/20; F02C 7/06; F02C 7/27; F02C 7/277; F02C 7/32; F05D 2240/50; F05D 2260/601; F05D 2260/98
See application file for complete search history.

(56) References Cited

U.S. PATENT DOCUMENTS

| 3,296,793 | A | * | 1/1967 | Davies | F01D 25/18 60/39.08 |
|---|---|---|---|---|---|
| 5,429,208 | A | * | 7/1995 | Largillier | F01D 25/20 184/6.11 |
| 2005/0135929 | A1 | * | 6/2005 | Waddleton | F16N 7/40 416/1 |
| 2009/0101444 | A1 | * | 4/2009 | Alecu | F16N 39/04 184/11.2 |
| 2011/0314830 | A1 | * | 12/2011 | Legare | F01D 25/20 60/772 |
| 2012/0111022 | A1 | * | 5/2012 | Dyer | F01D 25/24 60/788 |
| 2013/0177406 | A1 | | 7/2013 | Heaton et al. | |
| 2018/0128319 | A1 | | 5/2018 | Duffy et al. | |
| 2019/0368393 | A1 | * | 12/2019 | Edwards | F01D 25/18 |

* cited by examiner

*Primary Examiner* — Scott J Walthour
(74) *Attorney, Agent, or Firm* — Norton Rose Fulbright Canada LLP

(57) ABSTRACT

The gas turbine engine can have a bearing cavity, an ejector having an air/oil path fluidly connected to the bearing cavity, and a nozzle fluidly coupled with the air/oil path, the nozzle connected to a compressed air source.

16 Claims, 4 Drawing Sheets

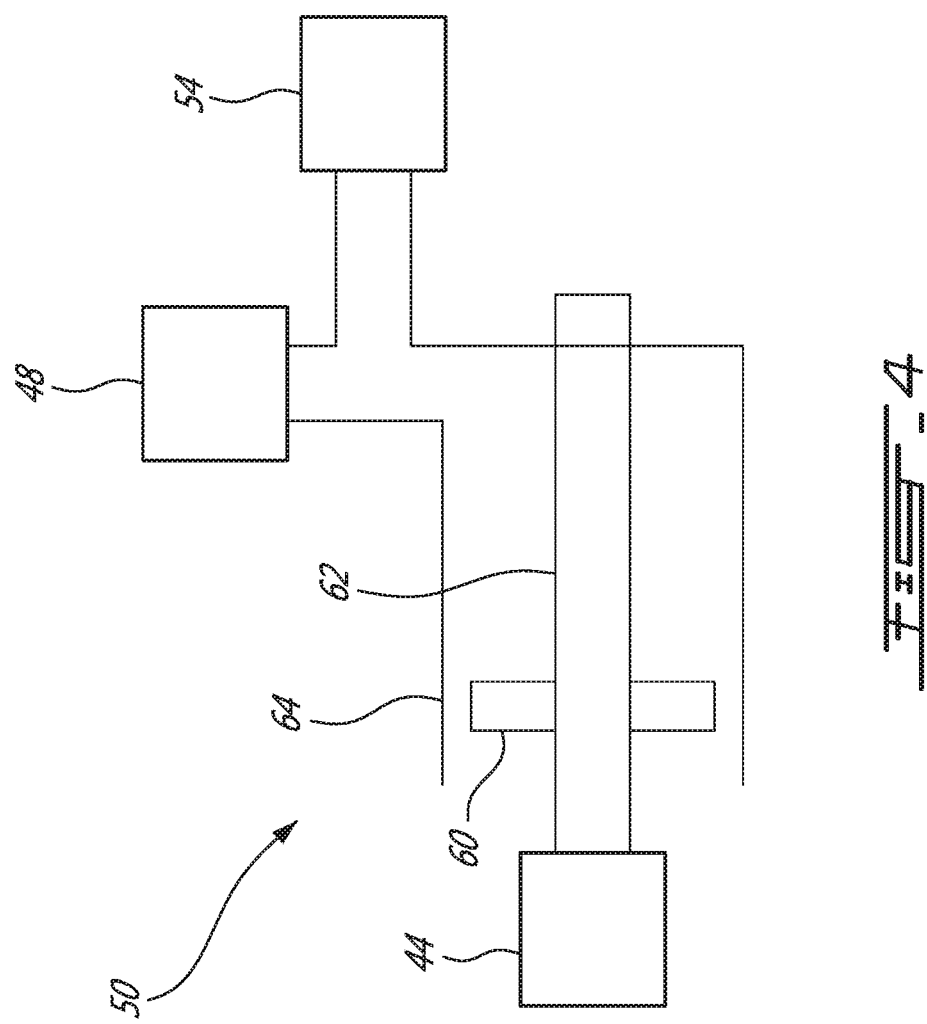

GAS TURBINE ENGINE OIL SCAVENGING SYSTEM AND METHOD

TECHNICAL FIELD

The application related generally to gas turbine engines and, more particularly, to oil scavenging systems therefore.

BACKGROUND OF THE ART

Gas turbine engines typically have a plurality of bearings via which components are rotationally held relative to one another. Such bearings may be lubricated with oil which is collected in a bearing compartment, and scavenged via a scavenge line to be re-used.

Although known scavenging systems were satisfactory to a certain degree, there remained room for improvement. In particular, it may be desired to improve scavenging suction in certain operating conditions.

SUMMARY

In one aspect, there is provided a gas turbine engine comprising an air starter, a bearing cavity, an ejector having an air/oil path fluidly connected to the bearing cavity and a nozzle fluidly coupled with the air/oil path, the nozzle being connected to receive compressed air from the air starter.

In another aspect, there is provided a method of operating a gas turbine engine including: feeding compressed air through a nozzle of an ejector, into an air/oil path of the ejector, the air/oil path being connected to a bearing cavity, the compressed air exiting the nozzle entraining surrounding fluid in the air/oil path and thereby causing suction at the bearing cavity.

In a further aspect, there is provided a gas turbine engine comprising a bearing cavity, an ejector having an air/oil path fluidly connected to the bearing cavity, and a nozzle fluidly coupled with the air/oil path, the nozzle connected to a compressed air source.

DESCRIPTION OF THE DRAWINGS

Reference is now made to the accompanying figures in which:

FIG. 4 is a simplified sketch of an air starter.

DETAILED DESCRIPTION

Figure 1:
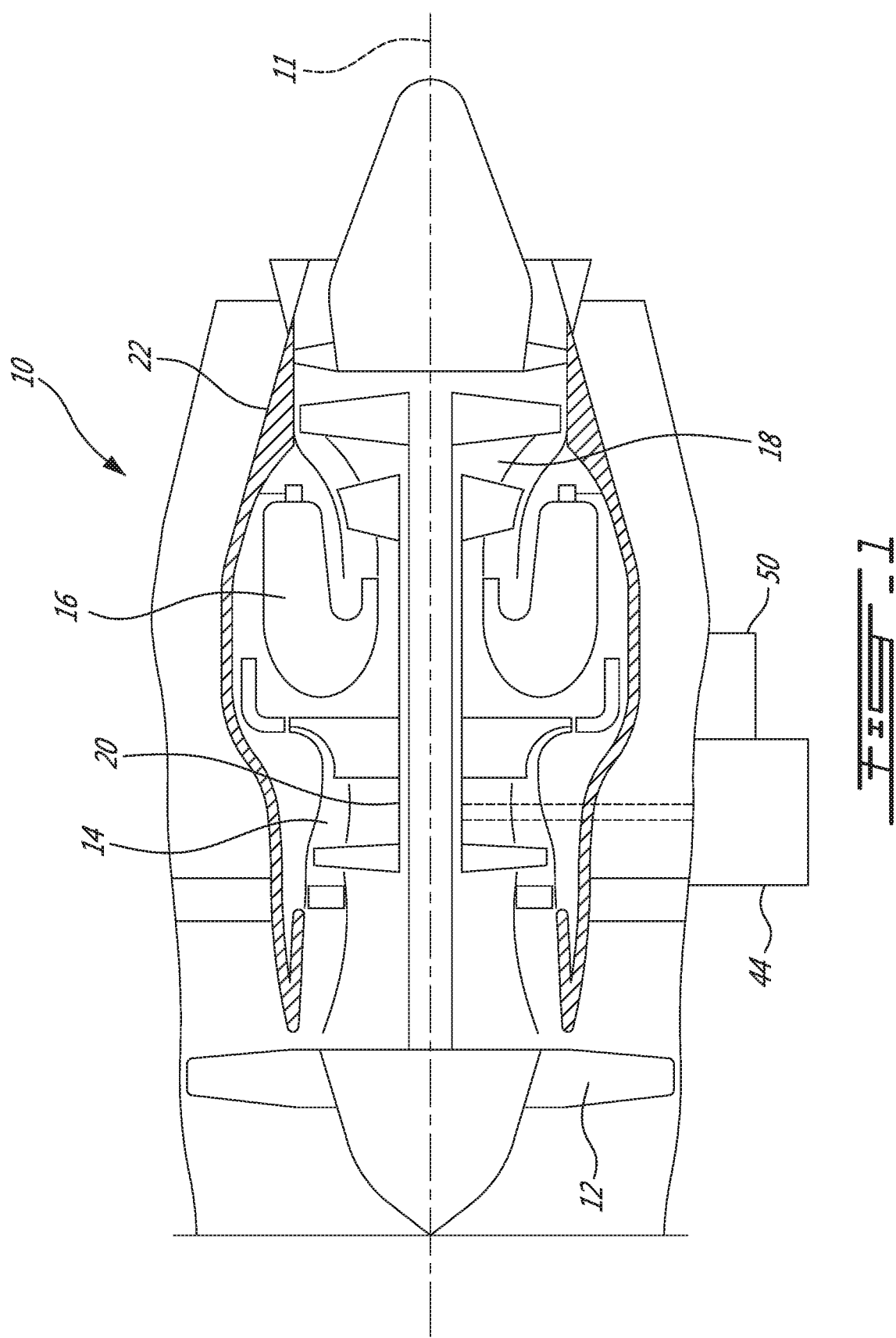
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, the compressor section 14, and the turbine section 18 rotate about a central axis 11 of the gas turbine engine 10. The gas turbine engine 10 includes an engine shaft 20 and an engine casing 22 disposed circumferentially around the engine shaft 20. The engine casing 22 is in part used to support the engine shaft 20.

A gas turbine engine such as shown in FIG. 1 can include a plurality of bearings which are used to provide a low-friction interface with components which rotate, such as between the high pressure shaft and the low pressure shaft 20, or between one or the other of these shafts and the engine casing 22. Typically, bearings are enclosed in chambers referred to as bearing cavities, and the bearing cavities are partitioned from the environment, which can be of significantly higher pressure, by seals on each axial side.

Figure 2:
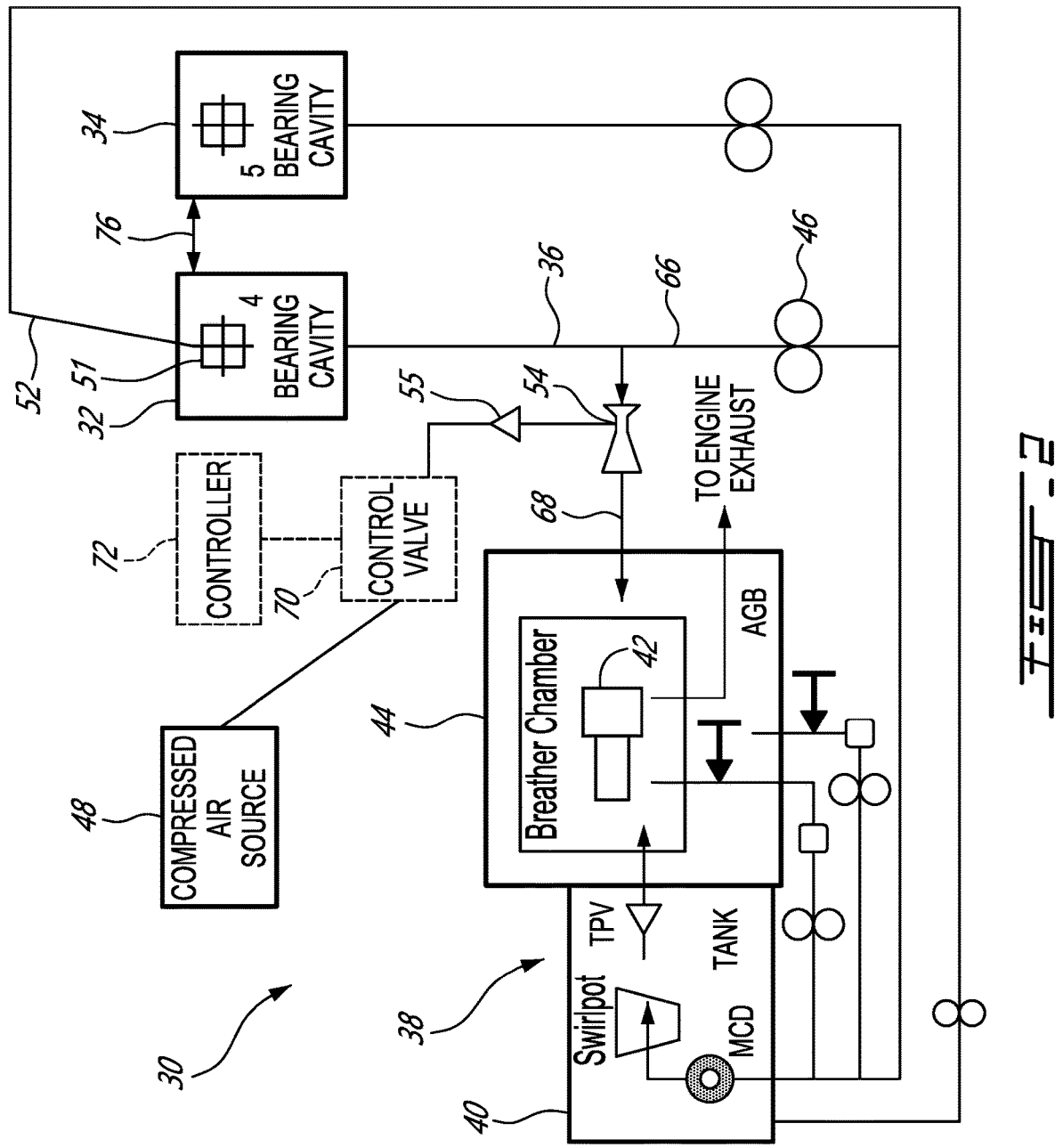
FIG. 2 is a block diagram of an oil scavenging system in accordance with one embodiment.

FIG. 2 shows an example embodiment of an oil scavenging system 30. Generally, the oil scavenging system involves imparting a lower pressure in at least one scavenge line 36 connected to a corresponding bearing cavity 32, to draw oil out from the cavity 32 into the scavenge line 36, and into an oil recuperation subsystem 38, typically involving some form of tank or reservoir 40. In this example, the oil scavenging system 30 is used to scavenge oil from two bearing cavities 32, 34. This is only an example, and in alternate embodiments, the oil scavenging system can be adapted to scavenge oil from only one, or more than two bearing cavities for instance. In this example, the oil recuperation subsystem 38 includes an oil tank 40, and also includes an air oil separator 42, which can be a rotating metallic foam separator such as the ones commonly used in the industry, for instance. It was found convenient to position the air-oil separator 42 in an accessory gearbox 44 with a vent to return separated air to the engine exhaust. The separated oil is returned to the oil tank 40, which can include a vortex type separator such as a swirlpot, for instance. It is common for oil scavenging systems to include filters to separate solid particles from the oil. Recuperated oil can be returned to the bearings 51, and to the bearing cavity(ies) 32, 34, via a return line 52.

In this embodiment, a pump 46 is used to lower the pressure in the scavenge line 36 and to increase the suction in bearing cavity 32. The pump 46 is optional and is not always present in alternate embodiments. Indeed, in certain cases, the pressure differential between the oil tank 40 and the bearing cavity 32 can be naturally sufficient or satisfactory in various operating conditions to avoid the need for a pump 46. It can be preferable for the pump 46 to be avoided because the pump 46 represents weight and costs, and also involves moving components and associated maintenance requirements. Nonetheless, many embodiments can use such a pump 46 to ensure a minimum level of suction. Even when a pump is used, it can be desired to limit its size to reduce weight and costs.

In some embodiments, whether a pump 46 is present or not, it may remain desirable to provide for increased suction in certain operating conditions in which it has been ascertained that above-average drainage requirements may exist. It can also be desirable to provide for such increased suction without adding a pump if one is not present, or without increasing the size of the pump 46 if one or more pumps are present. One way to achieve this, and which will now be detailed, is by the use of an ejector 54. The ejector 54 can be connected between the oil tank 40 and the bearing cavity 32, directly or indirectly to one, the other, or both, and can be connected to a source of compressed air 48 in a manner that when the compressed air is fed through the ejector's nozzle 56, the jet of compressed air entrains the surrounding fluid (e.g. air/oil mixture) and thereby provides additional suction to the bearing cavity 32. As will be discussed further below, the ejector 54 can be configured to operate continuously throughout engine operation conditions, or can be selectively activated and de-activated in a manner to be active only in certain engine operation conditions. The fluid connection between the ejector 54 and the source of compressed air 48 can include a non-return valve 55, or check valve, to prevent flow from the engine back-contaminating the air source 48 when the ejector 54 is not active, for instance. In this specification, the scavenge line(s) can be referred to as air/oil paths because they can carry oil and/or air, and typically a mixture of air and oil, during typical operating conditions.

Figure 3:
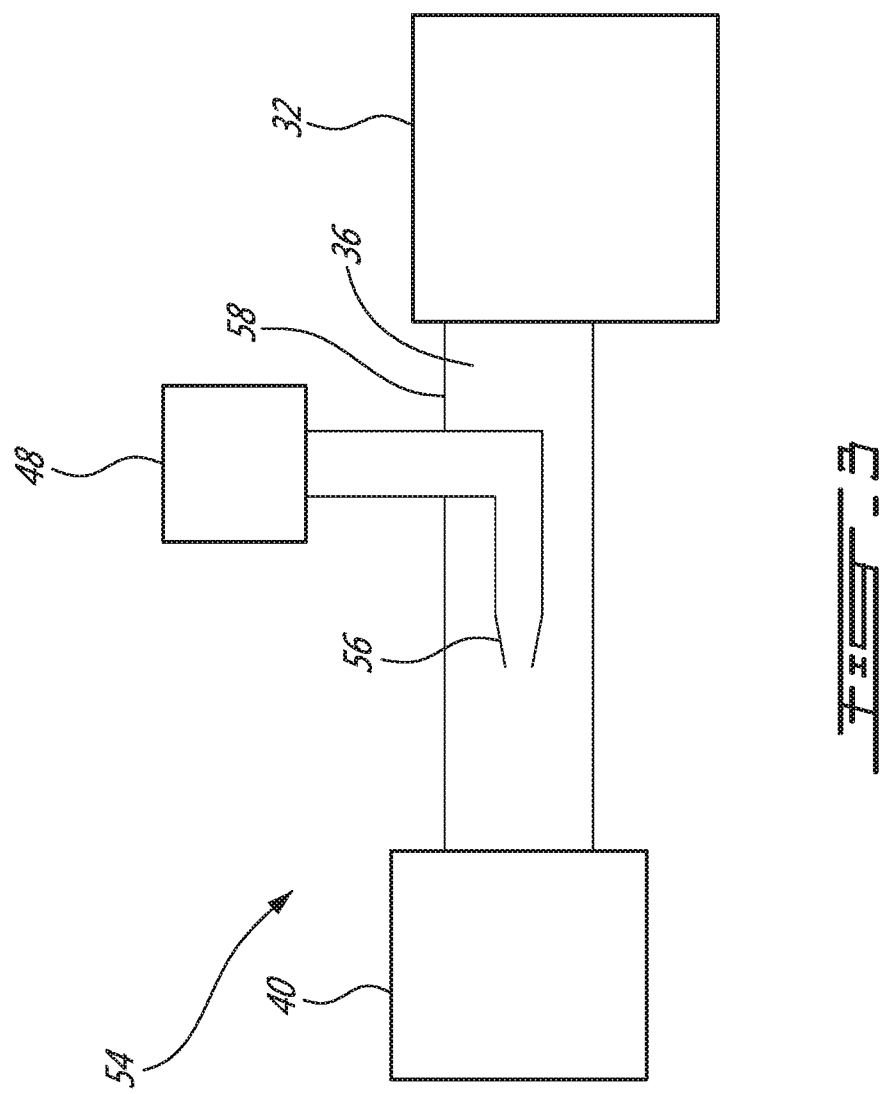
FIG. 3 is a simplified sketch of an example ejector.

A simplified sketch representing an ejector 54 is presented at FIG. 3. As shown, an ejector 54, which can be purchased "off the shelf" for instance, typically includes a nozzle 56 for ejecting a primary, or driving, fluid flow into a surrounding secondary fluid. In this case, the surrounding secondary fluid can be the air/oil mixture drained from the bearing cavity 32, for instance. The nozzle 56 produces a jet of compressed air during operation, and can be said to be "coupled" with the surrounding secondary fluid in the sense that it transfers some of its velocity to the secondary fluid and entrains it, increasing the velocity of the secondary fluid. This can create additional suction in the bearing cavity 32. The secondary fluid in this case is contained in a secondary conduit 58 of the ejector, and the secondary conduit of the ejector can be said to form a portion of the air/oil path or scavenging line 36.

In some embodiments, one particular operating condition where additional scavenging suction is required or desirable is engine starting. In such an embodiment, the source of compressed air used to drive an air starter can also be used as the source of compressed air for the ejector 56, for instance. Indeed, some aircraft turbine engines use an air starter as a means to start the engine, i.e. get the gas turbine engine to a sufficient RPM for the compression/combustion/energy extraction process to be sufficient to drive the engine core.

FIG. 4 presents a simplified sketch of an example embodiment of an air starter 50. In this example, the air starter 50 has blades 60 extending radially outwardly from a shaft 62. The blades 60 extend in a compressed air path 64 along which air from a compressed air source 48 is conveyed to drive the blades 60 and shaft 62 into rotation. The shaft 62 can be connected to the engine shaft via an accessory gearbox (AGB), and more specifically via gears provided therein. In an embodiment where the gas turbine engine has an air starter 50, compressed air can be bled from the air starter's compressed air source 48 to drive the ejector 54.

The air starter's compressed air source 48 can be an auxiliary power unit (APU), for instance. In alternate embodiments, the air starter 50 can use another compressed air source 48 than an APU, such as a ground source for instance. Using an air starter as a compressed air source to drive the ejector and its associated scavenging suction power can be a very elegant solution to cover the engine starting conditions, because in those cases, there is no additional equipment (apart from the bleed line) or control required: the ejector will naturally be driven when the air starter, which drives the engine starting conditions, will be active, and the ejector will naturally cease to be driven when the air starter ceases to operate.

There may, however, be other operation conditions where additional scavenging suction can be required or otherwise be desirable. Quick deceleration is an example of such a condition. In such other conditions, it may be preferred to use another compressed air source 48 than the air starter 50 to drive the ejector. One example solution would be to use compressor air from the gas turbine engine's own compressor 14 as the compressed air source, perhaps via a control valve 70 which can selectively (manually from user input or automatically based on sensor input and computing) be activated to either bleed air from the compressor to the ejector, or to close the path between the compressor and the ejector, for instance. This can be performed via a controller 72, for instance. Alternately, in one embodiment, the ejector 54 can be connected to both the air starter 50 and the compressor 14, and a valve 70 can be used to selectively toggle the connection from one to the other, for instance.

In the embodiment illustrated, it was preferred to use an auxiliary scavenge line 68 which branches off from a primary scavenge line 66 and directs the air/oil mixture into the oil tank 40 via the accessory gearbox 44, and more specifically the air/oil separator 42 rather than directly to the oil tank 40. This may be preferable in a context where a higher density of air is expected to stem from the nozzle, but is nonetheless a design preference associated to one embodiment, and it will be understood that in alternate embodiments, the ejector 54 can be integrated directly into a unique scavenge line, or can be integrated to a secondary scavenge line which is directly connected to the bearing compartment, independently of a primary scavenge line, to name two examples.

In the embodiment illustrated, as presented above, the oil scavenge system is connected to two bearing cavities, each having a corresponding scavenge line and a corresponding pump. In this embodiment, the two bearing cavities are connected to one another via a vent line 76 which allows at least some pressure equilibration between the bearing cavities 32, 34. Accordingly, the benefits of the added suction associated with the ejector 54 can be communicated to the second bearing cavity 34 via the vent 76. This is optional but nevertheless a nice to have feature in the specific context of the example.

The above description is meant to be exemplary only, and one skilled in the art will recognize that changes may be made to the embodiments described without departing from the scope of the invention disclosed. For example, in some embodiments, there may be no pump in the scavenge line. The pressure differential may be known to be sufficient throughout operating conditions to create sufficient suction at bearing compartment. Still other modifications which fall within the scope of the present invention will be apparent to those skilled in the art, in light of a review of this disclosure, and such modifications are intended to fall within the appended claims.

The invention claimed is:
1. A gas turbine engine, comprising:
 an air starter in fluid flow communication with a compressed air source;
 a bearing cavity having a scavenge outlet, the scavenge outlet fluidly connected to an oil reservoir via a primary scavenge line extending from the scavenge outlet to the oil reservoir;
 an ejector having an air/oil path fluidly connected to the bearing cavity, the ejector having:
  a nozzle fluidly coupled with the air/oil path, the nozzle having a first inlet connected to receive compressed air from the compressed air source via a compressed air line extending from the compressed air source to the first inlet;
  a second inlet in fluid flow communication with a secondary scavenge line for receiving scavenged oil, the ejector located on the secondary scavenge line, the secondary scavenge line stemming from the primary scavenge line between the scavenge outlet and the oil reservoir; and an outlet in fluid flow communication with both of the first inlet and the second inlet, the outlet being in fluid flow communication with the oil reservoir via the secondary scavenge line, and the air/oil path extending through the second inlet and the outlet, wherein compressed air fed through the nozzle entrains surrounding fluid in the air/oil path of the ejector to provide suction to the bearing cavity.

2. The gas turbine engine of claim 1, wherein the air/oil path of the ejector forms a portion of the secondary scavenge line and surrounds the nozzle.

3. The gas turbine engine of claim 1, further comprising a pump in the primary scavenge line, the pump located downstream of a connection point between the primary scavenge line and the secondary scavenge line.

4. The gas turbine engine of claim 1, further comprising an auxiliary gearbox, wherein the air starter has blades extending radially from a shaft, the shaft being connected to gears of the auxiliary gearbox, the blades extending in a compressed air path, the compressed air path being connected to the compressed air source, and wherein a non-return valve is positioned between the compressed air source and the ejector.

5. The gas turbine engine of claim 4, wherein the compressed air source is an auxiliary power unit.

6. The gas turbine engine of claim 5, further comprising a return line between the oil reservoir and the bearing cavity, across a bearing.

7. The gas turbine engine of claim 1, wherein the bearing cavity is a first bearing cavity, the gas turbine engine further comprising a second bearing cavity and a vent line connecting the first bearing cavity to the second bearing cavity.

8. The gas turbine engine of claim 1, wherein the secondary scavenge line connects the bearing cavity to the oil reservoir via an air/oil separator.

9. A gas turbine engine, comprising:
a bearing cavity having a scavenge outlet, the scavenge outlet fluidly connected to an oil reservoir via a primary scavenge line extending from the scavenge outlet to the oil reservoir;
an ejector having an air/oil path fluidly connected to the scavenge outlet of the bearing cavity, the ejector located on a secondary scavenge line stemming from the primary scavenge line between the scavenge outlet and the oil reservoir, the ejector having:
a nozzle fluidly coupled with the air/oil path, the nozzle having a first inlet connected to receive compressed air from a compressed air source via a compressed air line extending from the compressed air source to the first inlet;
a valve fluidly connected between the nozzle and the compressed air source, the valve being operable to selectively open or close a fluid path between the compressed air source and the nozzle; and
an outlet, the outlet of the ejector being connected to the oil reservoir via the secondary scavenge line,
wherein compressed air fed through the nozzle entrains surrounding fluid in the air/oil path of the ejector to provide suction to the bearing cavity.

10. The gas turbine engine of claim 9, further comprising in serial flow communication a compressor, a combustor, and a turbine, said nozzle being connected to draw compressed air from the compressor.

11. The gas turbine engine of claim 9, wherein the air/oil path of the ejector forms a portion of the secondary scavenge line and surrounds the nozzle.

12. The gas turbine engine of claim 9, comprising a pump in the primary scavenge line, the pump located downstream of a connection point between the primary scavenge line and the secondary scavenge line.

13. The gas turbine engine of claim 9, comprising a non-return valve between the compressed air source and the ejector.

14. The gas turbine engine of claim 9, wherein the compressed air source is an auxiliary power unit.

15. The gas turbine engine of claim 9, wherein the bearing cavity is a first bearing cavity, the gas turbine engine further comprising a second bearing cavity and a vent line connecting the first bearing cavity to the second bearing cavity.

16. The gas turbine engine of claim 9, wherein the secondary scavenge line connects the bearing cavity to the oil reservoir via an air/oil separator.

* * * * *